Aug. 21, 1956 F. W. SHIREY 2,759,570
AUTOMATICALLY CONTROLLED BRAKE APPARATUS INCLUDING
MEANS FOR MANUAL FAIL-SAFE OPERATION
Filed Sept. 15, 1953 2 Sheets-Sheet 2

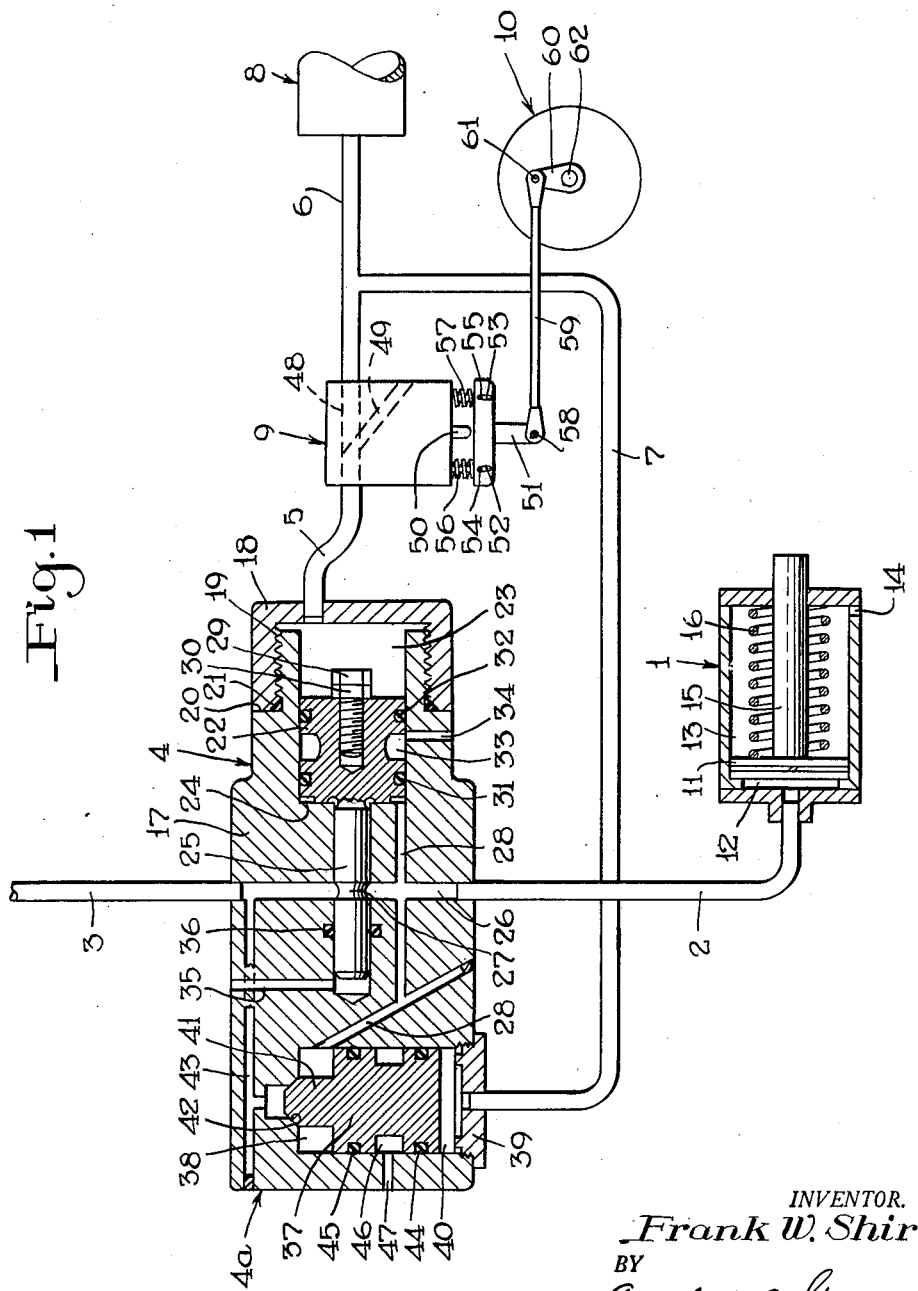

INVENTOR.
Frank W. Shirey
BY
Adelbert A. Steinmiller
ATTORNEY

United States Patent Office 2,759,570
Patented Aug. 21, 1956

2,759,570

AUTOMATICALLY CONTROLLED BRAKE APPARATUS, INCLUDING MEANS FOR MANUAL FAIL-SAFE OPERATION

Frank W. Shirey, Irwin, Pa., assignor to Westinghouse Air Brake Company, Wilmerding, Pa., a corporation of Pennsylvania Application September 15, 1953, Serial No. 380,305

10 Claims. (Cl. 188—181)

This invention relates to automatically controlled brake apparatus and, more particularly, to such brake apparatus including fail-safe means for assuring manual control of the brakes in the event of failure of fluid pressure by which the automatic devices of the apparatus are operated.

It is commonly known that present day airplanes are designed to travel at high rates of speed, and consequently, must land at high speeds also. It is also well known that in braking a wheel traveling at high speed the wheel is apt to slip on a runway and thereby rotate at a speed less than the ground speed of the airplane or vehicle, or it may become locked and slide, in either of which cases undue wear on the tires and possible blow-outs or other damage to the vehicle may occur.

Wheel-slip control means in the form of rotary inertia operable devices have heretofore been mounted on vehicle wheels for operating relatively to the rotary speed of said wheel to automatically control the application and release of the wheel brakes and eliminate the sliding condition which might occur due to untimely brake applications. Such a device is disclosed, for example, in U. S. Patent No. 2,573,387, issued to Rankin J. Bush on October 30, 1951. The device disclosed in that patent, however, is what may be called the pneumatic type in that it is intended to be used chiefly on vehicles equipped with pneumatic pressure operable brake systems. It is just as desirable, however, to prevent the sliding of wheels, due to braking, in hydraulic pressure operable brake systems, for example, and, accordingly, in the copending application of Lester A. Carlson and Robert H. Carlson, Serial No. 345,794, filed March 31, 1953, and assigned to the assignee of the present application, there has been disclosed an apparatus adapted to be employed with a rotary inertia operable control device, such as disclosed in the aforementioned patent, for rendering said device operable to control the brakes in a hydraulic pressure operable brake system.

The brake control apparatus disclosed in the aforementioned copending application includes a displacement piston valve device interposed in the conduit between the source of pressurized hydraulic fluid and the brake cylinder device on the wheel. The displacement piston valve device has a normal position in which a communication between the source of pressurized hydraulic fluid and the wheel brake cylinder device is open to permit flow of said pressurized hydraulic fluid to said wheel brake cylinder device and is operable to a cut-off position in which said communication is closed and said wheel brake cylinder device is relieved of hydraulic pressure by displacement of hydraulic fluid from the wheel brake cylinder device to a displacement chamber in said displacement piston valve device.

The displacement piston valve device disclosed in the aforementioned copending application includes a pressure chamber which is adapted to be connected to a source of pneumatic fluid under pressure, which is adapted for retaining said displacement piston valve device in its normal position. A release valve device, such as that disclosed in the aforementioned patent issued to Rankin J. Bush, is interposed in the conduit between the pressure chamber of the displacement piston valve device and the source of pneumatic fluid under pressure for controlling communication therebetween. Operation of the release valve device, in turn, is controlled by an inertia operable control device operatively associated with the vehicle wheel and said release valve device. If a slipping condition of the wheel occurs during braking by hydraulic pressure, the inertia device will automatically operate the release valve device, substantially as described in the aforementioned patent to Rankin J. Bush, to a release position in which the communication between the pressure chamber of the displacement piston valve device and the source of pneumatic fluid under pressure will be closed, and the pneumatic fluid pressure in said chamber will be vented to atmosphere. As a result of this exhausting of pneumatic fluid pressure from the pressure chamber of the displacement piston valve device, said piston valve device will operate to its cut-off position to cut off further supply of pressurized hydraulic fluid to the wheel brake cylinder device and to relieve said wheel brake cylinder device of hydraulic pressure for releasing the brakes on said wheel. When the slipping condition of the wheel has terminated and said wheel has accelerated back to the ground speed of the vehicle, the inertia device will automatically operate to permit the release valve device to operate to normal position in which the communication between the pneumatic pressure chamber in the piston valve device and the source of pneumatic fluid under pressure is re-established, so that said piston valve device will be operated to its normal position to re-establish the communication between the source of pressurized hydraulic fluid and the wheel brake cylinder device and thereby reapply the brakes to the wheel.

From the foregoing brief description of the apparatus disclosed in the aforementioned copending application, it should be apparent that should the source of pneumatic fluid under pressure fail during the time that it is desired to bring the vehicle to a stop the pneumatic pressure chamber of the displacement piston valve device could not be supplied with pneumatic fluid under pressure for operating said displacement piston valve device to its normal position. The piston valve device, therefore, would remain in its cut-off position in which the communication between the source of pressurized hydraulic fluid and the wheel brake cylinder device would be closed so that it would not be possible to make a brake application to the vehicle wheels.

One object of the invention, therefore, is the provision of means for use with apparatus, such as above described, for ensuring that the brakes on the vehicle wheels can be applied in the event of failure of the source of pneumatic fluid pressure.

Another object of the invention is the provision of means capable of operation, in case of failure of the source of pneumatic fluid pressure, to open a by-pass around the displacement piston valve device, above described, through which hydraulic pressure fluid may be supplied to and released from the brake cylinder device to apply and release the brakes on the wheels.

Still another object of the invention is the provision of means for automatically locking the above described displacement piston valve device in normal position, in case of undesired reduction in pressure of the pneumatic fluid, so as to ensure ability of controlling the brakes on the wheels in case of failure of the pneumatic fluid pressure supply.

Other and more detailed objects of my invention will appear in the following more detailed description thereof when read in conjunction with the accompanying drawings, wherein:

Fig. 1 is a diagrammatic view, partly in section and partly in outline, of a brake control apparatus embodying the invention, and Fig. 2 is a diagrammatic view, partly in section and partly in outline, of another form of the invention.

*Description—Fig. 1*

As shown in the drawing, for purposes of illustrating the invention, the brake control apparatus comprises a wheel brake cylinder device 1 which may be supplied with pressurized hydraulic fluid by way of a conduit comprising pipes 2, 3 leading from a master brake cylinder device (not shown), the hydraulic fluid in the master brake cylinder device being subjected to pressure physically applied by the operator of the vehicle to a brake foot pedal (not shown) or otherwise. Interposed between the pipes 2, 3 is a displacement piston valve device 4 for controlling communication, through said pipes, between the master brake cylinder device and the wheel brake cylinder device 1, said piston valve device being indirectly connected by way of pipes 5, 6 to a source of pneumatic fluid under pressure, such as a reservoir 8, for example. A by-pass valve device 4a, directly connected to the reservoir 8 by way of pipes 6 and 7, is associated with the piston valve device 4. A release valve device 9 is interposed between the pipes 5, 6 connecting the piston valve device 4 and the reservoir 8, while an inertia operable control device 10, controlled by the wheel adapted to be braked by the brake cylinder device 1, is provided for controlling the operation of said release valve device. While brake control apparatus for only one wheel is shown in the drawing, it is to be understood that like apparatus may be provided for each of the other wheels of a vehicle which is adapted to be employed for braking purposes, the pipe 3 and the reservoir 8 being common, however, to all such control apparatus.

The wheel brake cylinder device 1 is adapted to be arranged in conventional manner for applying brakes (not shown) to a vehicle wheel (not shown) and comprises a casing containing a piston 11 at one side of which there is a hydraulic pressure chamber 12 adapted to be connected through the pipes 2, 3 to the master brake cylinder device and at the opposite side a non-pressure chamber 13 vented to atmosphere through a port 14 in the casing. The piston 11 has concentrically associated therewith in chamber 13 a piston rod 15 extending beyond the limits of the casing and adapted for controlling the brakes of the vehicle wheel by suitable means (not shown). Upon pressurization of hydraulic fluid contained in the master brake cylinder device, in pipes 2, 3 and thereby in pressure chamber 12, as above described, the piston 11 and the piston rod 15 are adapted to be moved in the direction of the right hand, as viewed in the drawing, to a brake applying position in which the brakes on the vehicle wheel are applied. Upon removal of pressure on the hydraulic fluid in the master brake cylinder device and, thereby, in pipes 2, 3 and pressure chamber 12, a spring 16 may be provided in chamber 13 to act on the piston 11 to move said piston and the piston rod 15 back to a normal position in which the brakes on the vehicle wheel are released.

The displacement piston valve device 4 and the by-pass valve device 4a are contained in a casing comprising two sections 17 and 18 assembled to each other by means of screw-threads 19, the section 18 abutting a shoulder 20 of section 17. A sealing ring 21 is annularly disposed at the joint of the casing sections 17 and 18 to prevent leakage of fluid under pressure at said joint.

The casing section 17 is provided with a counterbore, the open end of which is closed by the casing section 18, and slidably received in said bore is a piston 22 between which piston and the casing section 18 there is a pneumatic pressure chamber 23, while at the opposite side of said piston is a hydraulic pressure chamber 24. A piston valve 25, slidably mounted in a bore in casing section 17, is fixedly and coaxially associated with the piston 22 and extends away from the side of said piston adjacent the hydraulic chamber 24 to intersect, in the casing section 17, a passageway 26 which has an inlet side opening to pipe 3 and an outlet side opening to pipe 2, said inlet and outlet sides opening opposite to each other and to the bore containing said valve. The piston valve 25 is provided with a reduced portion 27 which is adapted to register with the inlet and outlet sides of passageway 26 to establish a communication, through said passageway, between pipes 2 and 3 when said piston valve and the piston 22 are in a normal position, in which they are shown in the drawing. The piston 22 and the piston valve 25 are slidably operable toward a right-hand position, as viewed in the drawing, to what may be called a hydraulic fluid cut-off position, in which the reduced portion 27 is out of registry with the inlet and outlet sides of passageway 26 thereby closing the communication through said passageway between pipes 2 and 3. Chamber 23 is connected by way of the pipe 5 to the release valve device 9, while chamber 24 is open to a passageway 28 intersecting the passageway 26 on the outlet side thereof.

A stop bolt 29 is adjustably mounted in the piston 22 at the side adjacent chamber 23 and is adapted for abutting contact with the end wall of casing section 18 to define the cut-off position of the piston 22 and the piston valve 25. A lock nut 30 on bolt 29 is provided for engagement with piston 22 to secure the bolt 29 in an adjusted position.

Annular sealing rings 31 and 32 carried by piston 22 have sealing and sliding contact with the wall of the bore in which said piston is disposed to minimize leakage of fluid under pressure from chambers 23 and 24. The piston 22 is provided, intermediate the sealing rings 31, 32, with an annular groove 33 in constant communication with atmosphere through a port 34 to dissipate any fluid which might leak past said sealing rings. The base of the bore in the casing section 17, in which the piston valve 25 is received, is vented to atmosphere by an opening 35 in said casing section. The opening 35 also provides a drain for any fluid which might leak past a sealing ring 36 carried by the casing section 17 and having sealing and sliding contact with the piston valve 25.

The casing section 17 is bored at the end opposite the piston valve device 4 to slidably receive a piston 37 of the by-pass valve device 4a, which piston cooperates with said casing section to define at one side of said piston a hydraulic pressure chamber 38 open to passageway 28, and cooperates with said casing section and a closure cap 39 to define at the opposite side a pneumatic pressure chamber 40 open to the pneumatic pressure reservoir 8 by way of pipes 6, 7. A valve 41 is formed integrally with the piston 37 at the side adjacent hydraulic chamber 38 and is adapted, when said piston is in a normal position in which it is shown in the drawing, to seat on a valve seat 42 formed at the base of said hydraulic chamber, the area of said valve within said seat being connected by a passageway 43 to passageway 26 and pipe 3. The piston 37 is operable to a by-pass position adapted to be defined by abutting contact of said piston with the closure cap 39, in which position the valve 41 is unseated, thereby establishing a communication between passageways 43 and 28 through the chamber 38.

Annular sealing rings 44 and 45, which have sealing and sliding contact with the surface of the bore containing the piston 37 are disposed at opposite ends of said piston to minimize leakage of fluid under pressure from chambers 38 and 40. The piston 37 is further provided, intermediate the sealing rings 44 and 45, with an annular groove 46 open to atmosphere through a passage 47 to dissipate any fluid which might leak past said sealing rings.

The reservoir 8, constituting a source of pneumatic fluid under pressure, may be charged, prior to operation of the vehicle, with air at sufficient pressure which, acting in chamber 23 and in chamber 40, will hold the piston 22 and the piston 37, respectively, in their normal position against opposing brake applying pressure of hydraulic fluid in chamber 24 and chamber 38, respectively, during a trip or operation of the vehicle.

The release valve device 9, which is shown in outline in the drawing, is interposed between pipes 5 and 6 for controlling communication therebetween, and between pipe 5 and atmosphere, and may be, for example, like that disclosed in the aforementioned patent issued to Rankin J. Bush.

Briefly, the device 9 comprises valve means (not shown) having a normal position in which communication between pipes 5 and 6 is open by way of a communication 48 indicated schematically by dash lines, and a pneumatic fluid pressure release position in which communication between said pipes is closed and pipe 5, and thereby chamber 23 in device 4, are open to atmosphere by way of a communication 49 indicated schematically by dash lines.

The release valve device 9 also comprises a pilot valve (not shown) mechanically operable for rendering either one or the other of communications 48 or 49, above described, effective. This pilot valve has a stem 50 projecting to the exterior of said casing, said valve stem being arranged to have its projecting end engaged by a T-shaped operating lever 51 at the junction of two oppositely extending arms. The two arms of lever 51 have near their respective ends slots 52 and 53 through which pins 54 and 55, secured to the casing, extend, respectively. Two like springs 56 and 57, under pressure, are interposed between the casing of the device 9 and the opposite ends of the two arms, respectively, of the operating lever 51 to bias said lever to a central, normal position in which said lever disengages the end of valve stem 50 to render communication 48 effective and to close communication 49, said operating lever being pivotable about either one or the other of the pins 54 or 55 so as to engage and move the valve stem 50 into the device 9 to close communication 48 and open communication 49. A portion of the operating lever 51 depends from the junction of the two oppositely extending arms and is pivotally connected at its lower end by means of a pin 58 to one end of a link rod 59, the other end of said link rod being pivotally connected to one end of a rocker arm 60 by means of a pin 61. The other end of the rocker arm 60 is rigidly attached to an operating shaft 62 of the inertia operable control device 10.

The inertia operable device 10, which is shown in outline in the drawing, may be of any suitable type, but preferably is a rotary type, such as that disclosed, for example, in the aforementioned patent issued to Rankin J. Bush, including a housing adapted to be coaxially and fixedly mounted on the vehicle wheel. While not shown in the drawing and not deemed essential to an understanding of the invention, the housing of the inertia device 10 contains a relatively rotatable rotary inertia mass connected through clutch means and a cluster of planetary gears to the operating shaft 62, so that, when rotation of said inertia mass is in synchronization with the rotation of the vehicle wheel or what may be called a normal rotating position occupied when said wheel is not slipping on a runway surface, no rotative effect is produced on said operating shaft, but when, as applied to an airplane, said wheel is accelerating to ground speed immediately following touchdown or when said wheel is decelerating in response to slip on the running surface, said inertia mass will either lag behind or overrun, respectively, said wheel and operate said shaft to in turn operate the release valve device 9 to its release position.

In operation, let it be assumed that reservoir 8 is charged with pneumatic fluid at desired pressure, that the several devices comprising the brake control apparatus are in their respective normal positions, in which they are shown in the drawing, as a consequence of which chamber 23 of the piston valve device 4 is charged with pneumatic fluid under pressure from reservoir 8 by way of pipe 5 which is open through communication 48 in device 9 to pipe 6, and that chamber 40 of the by-pass valve device 4a is also charged with pneumatic fluid under pressure from said reservoir by way of pipes 6, 7. Also assume that pipe 3, passageways 26, 43, 28, chamber 24 of the piston valve device 4 and chamber 38 of the by-pass valve device 4a, the seated side of valve 41, pipe 2, and chamber 12 of the wheel brake cylinder device 1 contain non-pressurized hydraulic fluid, as a result of which the brake cylinder piston 11 will be in its brake release position releasing the brakes on the respective wheels (not shown).

Let it also be assumed that the landing wheels of the airplane, in landing, have just made contact with the surface of the runway. The pilot of the airplane, upon touchdown of the landing wheels on the runway surface, or shortly thereafter, will actuate his foot pedal and thereby the master brake cylinder (not shown) to pressurize the hydraulic fluid in pipe 3, passageways 26, 43, 28, pipe 2 and chamber 12 of the brake cylinder device 1.

Immediately upon touchdown of the landing wheel, said wheel will start to accelerate and overrun the rotary inertia mass contained in the inertia control device 10 and thereby effect an angular movement of the operating shaft 62 and the rocker arm 60 out of normal position in a clockwise direction, as viewed in the drawing. This movement of arm 60, acting through link 59, will rock the lever 51 of the release valve device 9 about the pin 55 in a counter-clockwise direction, as viewed in the drawing, against the opposing force of spring 57. This rocking of lever 51 will actuate the stem 50 and the pilot valve contained in the release valve device 9 to render communication 48 ineffective and communication 49 effective, thereby releasing the pneumatic fluid pressure in chamber 23 of the piston valve device 4 to atmosphere by way of pipe 5 and communication 49.

The inertia device 10 will respond to acceleration of the landing wheel to open chamber 23 in the device 4 to atmosphere, as just described, almost instantaneously at the start of acceleration of the landing wheel upon touchdown.

As soon as a slight hydraulic pressure, incident to the depression of the brake pedal by the pilot, is obtained in chamber 24, whether slightly prior to the venting of chamber 23, coincidental therewith or after such venting has been effected, such pressure, with chamber 23 vented, will move the piston 22 and valve 25 to their cut-off position closing communication between pipes 3 and 2 and enlarging chamber 24 to receive fluid from the brake cylinder chamber 12 and thereby relieve the brake cylinder piston 11 of any hydraulic pressure which may have been acting thereon. It is desired to point out, however, that if the brake pedal is not prematurely operated, the piston 22 will move the valve 25 to its cut-off position, as above described, before sufficient hydraulic pressure can be obtained in the brake cylinder pressure chamber 12 to start applying the brakes on the landing wheel. In the manner just described, an application of brakes to the landing wheel may be automatically prevented at the time of touchdown of said wheel.

When, after touchdown, the landing wheel has become accelerated to substantially ground speed, the inertia mass in the inertia device 10 will obtain a corresponding speed and permit spring 57 to return lever 51 to its normal position out of contact with the valve stem 50, thereby permitting the pilot valve contained in the release valve device 9 to operate to disestablish communication 49 and re-establish communication 48. With communication 48 re-established, chamber 23 of the piston valve device 4 will again be charged with pneumatic fluid pressure from reservoir 8, as above described. The pneumatic fluid pressure thus provided in chamber 23 from reservoir 8 acting on piston 22 produces a force exceeding that of hydraulic fluid which may be present in chamber 24, whereby the piston 22 and piston valve 25 will be promptly moved back to their normal positions, and in so doing said piston will force the hydraulic fluid in chamber 24 back through passageways 28, 26 and pipe 2 into chamber 12 of the wheel brake cylinder device 1. With piston valve 25 once again in its normal position, the reduced portion 27 will register with the inlet and outlet sides of passageway 26 to re-establish communication between pipes 3 and 2 so that hydraulic fluid at desired braking pressure, determined by the pilot's pressure on the foot pedal, will be transmitted to chamber 12 of the wheel brake cylinder device 1 for actuating piston 11 therein, against opposing force of spring 16, to effect braking of the landing wheel.

Let it now be assumed that, with the brakes applied to the landing wheel, said wheel runs into an uneven or slippery condition on the runway where the traction is insufficient to keep said wheel rolling against the retarding action of the brakes applied to said wheel. As a result, the wheel will begin to slip and decelerate relative to the rotary inertia mass in the inertia control device 10 whereby the shaft 62 and the rocker arm 60 will be rocked in a counterclockwise direction and turn lever 51 from normal position about the pin 54 in a clockwise direction, as viewed in the drawing, against the opposing force of spring 56 and thereby operate the pilot valve contained in the release valve device 9 to disestablish communication 48 and establish communication 49, whereby pneumatic fluid pressure in chamber 23 of the piston valve device 4 will be released, as heretofore described.

In the manner hereinbefore described, the piston valve device 4 will be operated by hydraulic pressure in chamber 24 in response to such release of pneumatic pressure from chamber 23 to close communication between the brake cylinder device 1 and pipe 3 leading from the master brake cylinder device and to enlarge chamber 24 to receive hydraulic fluid, through pipe 2 and passageways 26, 28, from chamber 12 of the brake cylinder device 1, whereupon the spring 16 will move the piston 11 and piston rod 15 back toward their normal position and release the brakes on the landing wheel.

Having released the brakes on the landing wheel in response to slipping thereof, in the manner just described, said wheel will accelerate back to the ground speed of the airplane whereupon the inertia control device 10 will effect operation of the release valve device 9 and thereby of the piston valve device 4 to displace hydraulic fluid from chamber 24 back into the pressure chamber 12 of the brake cylinder device 1 to reapply the brakes on the landing wheel. If the landing wheel again starts to slip before the airplane comes to a stop, the brakes thereon will again be released and, upon cessation of wheel slip, reapplied in the same manner as above described, until eventually the airplane comes to a stop, it being noted that actual locking and sliding of the wheel is positively prevented during stopping of the airplane.

There is a possibility, however, as hereinbefore noted, that, during the course of bringing the airplane or vehicle to a stop, or prior thereto, the pneumatic pressure in the reservoir 8 may be reduced to a point below which such pressure, when applied to chamber 23 of the piston valve device 4, would be insufficient to overcome the opposing hydraulic pressure in chamber 24 to operate the piston 22 and the piston valve 25 to their normal position, or the fluid pressure in said reservoir may fail completely, so that communication between pipes 2 and 3, through passageway 26, would be closed. Assuming that such a failure of pneumatic fluid pressure in the reservoir 8 occurs while the pilot is bringing the airplane to a stop, the pneumatic pressure in chamber 40 of the by-pass valve device 4a will also be reduced accordingly, for said chamber, as previously noted, is directly connected to said reservoir by way of pipes 6 and 7. The opposing hydraulic pressure acting on piston 37 in the chamber 38 and on the seated area of the valve 41 in passageway 43, or only on the latter in case pipe 2 is disconnected from pipe 3 and is not pressurized, will then operate the piston 37 to its by-pass position thereby unseating the valve 41 from the seat 42 to permit pressurized hydraulic fluid from pipe 3 and passageway 43 to flow through chamber 38, passageways 28 and 26 and pipe 2 to chamber 12 of the wheel brake cylinder device 1 to apply the wheel brakes. With the piston 37 in its by-pass position, as just described, the pilot of the airplane can manually control the application and release of the brakes on the landing wheel until the pneumatic pressure failure in the reservoir 8 has been corrected or the airplane has been brought to a stop.

When the pneumatic pressure in reservoir 8 has been restored to effective operating pressure, the pneumatic pressure in chamber 40 will accordingly be restored, through pipes 6 and 7, to operate the piston 37 to its normal position, thereby seating the valve 41 on the valve seat 42 to close communication between passageway 43 and passageway 28 through chamber 38. At the same time pneumatic fluid pressure will be restored in chamber 23 of the piston valve device 4 to restore communication between pipes 2 and 3 through the inlet and outlet sides of passageway 26, and the braking and releasing of the landing wheel will revert to automatic control by the release valve device 9 and the inertia control device 10, as above described.

*Description—Fig. 2*

According to this embodiment of the invention, instead of the by-pass valve device 4a, I employ an electric switch device 63, controlled by pressure of fluid in the pneumatic pressure reservoir 8, to control an electromagnetic locking device 64 for a piston valve device 65 which, except for the casing 66, may be identical to the piston valve device 4 and, hence, the same reference numerals have been applied to corresponding parts thereof, as well as to other parts of the brake apparatus, which may be the same as those employed in the apparatus shown in Fig. 1.

The fluid pressure controlled electric switch device 63 may comprise a casing containing therein a piston 85 which cooperates with said casing to define at one side of said piston a pneumatic fluid pressure chamber 86 open to the reservoir 8 by way of a pipe 87 and pipe 6 and at the opposite side a non-pressure chamber 88 vented to atmosphere by way of a port 89 in said casing. A piston rod 90 having one end fixedly and concentrically mounted on the side of piston 85 exposed to chamber 88, extends through said chamber to the exterior of the casing, terminating at the other end with a contact plate 91 which is insulated from said piston rod by suitable insulating material 92. The contact plate 91 is adapted for bridging and electrically connecting contacts 93 and 94, which are associated with conductors 95 and 96, respectively, when the pinion 85 is operated from a normal, open circuit position, in which it is shown in the drawing, to a closed circuit position. A spring 97 in chamber 88 acts on piston 85 to urge said piston toward its closed circuit position upon reduction in pressure of pneumatic fluid in the reservoir 8, and consequently in chamber 86, to a value slightly above that required in chamber 23 of the device 65 to hold the piston 22 in its normal position against opposing maximum brake applying pressure of hydraulic fluid in chamber 24.

The conductor 96 leads to a terminal 98 of the electro-magnetic device 64, while the conductor 95 is connected to the negative terminal of a source of electrical energy, such as a battery 99, for example. The positive terminal of the battery 99 is connected to a conductor 100 leading to a terminal 101 of the electro-magnetic device 64.

The electro-magnetic locking device 64, shown partly in outline and partly in section, according to the invention, is fixedly mounted to the casing 66 of the piston valve device 65 by suitable means, such as a plurality of screws 102, and comprises the usual type of solenoid (not shown) which, when electrically energized, will actuate a plunger 103 out of a normal position, in which it is shown in the drawing, through a bore 104 in casing 66, to a locking position defined by engagement of said plunger in the annular groove 33 of the piston 22, to hold said piston and the piston valve 25 against movement out of their normal position. A sealing ring 105, disposed in the casing 66 and encircling the bore 104, has sealing and sliding contact with the plunger 103 to prevent leakage of any fluid past said plunger into the electromagnetic device 64.

A latch 106, disposed in a bore 107 in the casing of the electro-magnetic device 64, is adapted to be actuated by a spring 108 into a recess 109 in the plunger 103 for arresting said plunger in its locking position. A retaining nut 110 is provided for retaining the latch 106 and the spring 108 in the bore 107.

In operation, unless there is a failure of pneumatic fluid pressure in reservoir 8 or unless such pressure becomes reduced to near the value which, acting in chamber 23, would be insufficient to move and maintain the piston 22 and valve 25 in their normal position against maximum pressure of hydraulic fluid obtainable in chamber 24 and the brake cylinder device 1, the piston 22 and valve 25 of piston valve device 65, the release valve device 9 and the control device 10, as shown in Fig. 2, will operate in the same manner as corresponding parts of the apparatus shown in Fig. 1 and above described to control the braking of the landing wheel.

Let it now be assumed that the pneumatic fluid pressure in reservoir 8 has failed or has been reduced to the value at which the spring 97 of the electric switch device 63 will overcome the pneumatic pressure in chamber 86. The spring 97 will then actuate the piston 85 to its closed circuit position in which the contact plate 91 will bridge the contacts 93 and 94 of the conductors 95 and 96, respectively. With this circuit closed, electrical energy from the battery 99 will energize the solenoid of the electro-magnetic device 64 to which the plunger 103 will respond and be moved to its locking position in the piston 22 to lock said piston, and consequently the piston valve 25, in their normal position. With the piston 22 and the piston valve 25 thus locked in their normal position, the pilot can manually control the braking of the landing wheel until the airplane is brought to a stop even though the reservoir 8 may become completely void of fluid under pressure.

During such time that the pneumatic pressure in reservoir 8 is below the point at which it can move the piston 22 and valve 25 to normal position, it is essential that the plunger 103 of the electro-magnetic locking device 64 be maintained in its locking position in order that the piston 22 and the piston valve 25 also be maintained in their normal position. It is conceivable, however, that the electrical system, which energizes the solenoid to maintain the plunger 103 in its locking position, might also fail subsequent to or during the time when the pneumatic pressure in reservoir 8 is below its effective operating pressure. In case of such a contingency, the latch 106, provided on the electro-magnetic locking device 64, will hold the plunger 103 in its locking position and thereby the piston 22 and valve 25 in their normal position, it being noted that upon movement of the plunger 103 to its locking position, the spring 108 will actuate the latch 106 to enter the recess 109 in said plunger.

When the pneumatic pressure in the reservoir 8 and consequently in chamber 86 of the electric switch device 63 has been restored to the value at which it will overcome the opposing force of the spring 97 in said electric switch device, the piston 85 will be operated to its normal position, thereby moving the contact plate 91 out of contact with the contacts 93 and 94 to open the circuit through the solenoid of the device 64. With the circuit open the solenoid of the electro-magnetic device 64 will be de-energized, and the latch 106 may then be manually released to permit the plunger 103 to return to its normal position, whereupon the piston valve device 65 may revert to automatic control by the release valve device 9 under control of the control device 10, as above described.

Summary

From the foregoing description, it should be apparent that I have provided a hydraulic pressure operable brake control apparatus, automatically controlled by a pneumatic type wheel-slip control device, having means for preventing failure of the hydraulic brake apparatus upon failure of the supply of pneumatic fluid under pressure for the wheel-slip control device.

Having now described my invention, what I claim as new and desire to secure by Letters Patent, is:

1. In a brake control apparatus, the combination comprising a first means responsive to hydraulic pressure for effecting a brake application on a vehicle wheel and to relief of such pressure for effecting a brake release, conduit means providing for flow of pressurized hydraulic fluid to said first means, a source of pneumatic fluid under pressure, valve means controlling communication through said hydraulic conduit means by being connected to said source of pneumatic fluid under pressure and being responsive to said pneumatic fluid from said source at a pressure in excess of a chosen degree to open said communication and responsive, upon relief of said pneumatic pressure, to hydraulic pressure in said conduit means to close said communication, means responsive to a slipping condition of said wheel to release pneumatic pressure from said valve means and to termination of said slipping condition to open fluid pressure supply communication from said pneumatic source to said valve means, and means also connected to and controlled by pressure of pneumatic fluid at said source operative to insure provision of pressurized hydraulic fluid to said first means upon reduction of said pneumatic pressure at said source to a certain degree below said chosen degree.

2. In a brake control apparatus, the combination comprising a brake cylinder device responsive to hydraulic pressure for effecting a brake application on a wheel of a vehicle and to relief of such pressure for effecting a brake release, conduit means providing for flow of pressurized hydraulic fluid to and from said brake cylinder device, a source of pneumatic fluid under pressure, valve means controlling communication through said hydraulic conduit means by being connected to said source of pneumatic fluid under pressure and being responsive to said pneumatic fluid from said source at a pressure exceeding a chosen degree to open said communication and responsive, upon relief of said pneumatic pressure, to hydraulic pressure in said conduit means to close said communication, a release valve device having one position in which pneumatic fluid under pressure is supplied to said valve means from said source and operable to a release position in which said valve means is relieved of pneumatic pressure, a control device arranged with said wheel and operative to move said release valve device to its release position in response to reduction in the peripheral speed of said wheel relative to the ground speed of said vehicle, and means also connected to and controlled by pressure of pneumatic fluid at said source operative to insure provision of pressurized hydraulic fluid to said brake cylinder device upon reduction of said pneumatic pressure at said source to a certain degree below said chosen degree.

3. In a brake control apparatus, the combination comprising a brake cylinder device responsive to hydraulic pressure for effecting a brake application on a vehicle wheel and to relief of such pressure for effecting a brake release, conduit means providing for flow of pressurized hydraulic fluid to and from said brake cylinder device, a source of pneumatic fluid under pressure, valve means controlling communication through said conduit means by being connected to said source of pneumatic fluid under pressure and being operable in response to pneumatic pressure from said source, in excess of a chosen degree, to a first position to open said communication and operable in response to hydraulic pressure in said conduit means, upon relief of said pneumatic pressure, to a second position to close said communication and comprising means operative upon movement of said valve means from said first position to said second position to create a volume open to said brake cylinder device to receive hydraulic fluid therefrom and operative upon movement from said second position to said first position to displace said hydraulic fluid from said volume to said cylinder device, control means responsive to a slipping condition of said wheel to effect relief of pneumatic pressure from said valve means and responsive to termination of said slipping condition to open fluid pressure supply communication from said source to said valve means, a communication having one end connected to said conduit means at one side of said valve means and the other end connected to said conduit means at the other said of said valve means to thereby provide a normally-closed communication for delivery of pressurized hydraulic fluid to and from said brake cylinder device in by-passing relation to said valve means, and a by-pass valve device connected to said source of pneumatic fluid under pressure and operative in response to pressure of fluid at said source, when in excess of a certain degree above said chosen degree, to close said by-passing communication and in response to reduction of pressure at said source below said certain degree to open said by-passing communication.

4. A brake control apparatus comprising, in combination, a brake cylinder device responsive to hydraulic pressure for effecting a brake application on a vehicle wheel and to relief of such pressure for effecting a brake release, conduit means comprising two pipes normally in communication with each other, one of said pipes being adapted for transmitting pressurized hydraulic fluid from a source, the other for transmitting said pressurized hydraulic fluid from said one pipe to said brake cylinder device, a source of pneumatic fluid under pressure, a piston valve device connected to said source of pneumatic fluid under pressure for controlling communication between said two pipes, said piston valve device being operable in response to pneumatic pressure from said source of pneumatic fluid pressure, in excess of a chosen degree, to open said communication and operable in response to hydraulic pressure in said conduit means, upon relief of such pneumatic pressure to close said communication, control means responsive to a slipping condition of said wheel to effect relief of pneumatic pressure in said piston valve device and to termination of said slipping condition to open said piston valve device to said source of pneumatic fluid pressure, and a by-pass valve device comprising a piston having at one side a pneumatic pressure chamber constantly open to said source of pneumatic fluid under pressure and at the opposite side a hydraulic chamber, a first passageway connecting said hydraulic chamber to said other pipe, a second passageway open to said one pipe, said piston being responsive to pressure of pneumatic fluid, in excess of a certain degree above said chosen degree, in said pneumatic chamber to operate to a normal position in which communication between said passageways is closed and responsive to hydraulic pressure in said hydraulic chamber, upon reduction of pneumatic pressure in said pneumatic chamber to a degree lower than said certain degree, to operate to a by-pass position in which communication between said passageways is open, and a valve associated with said piston for controlling communication between said passageways, said valve being operative to open such communication upon operation of said piston to its by-pass position and to close such communication upon operation of said piston to its said normal position.

5. A brake control apparatus comprising, in combination, a brake cylinder device responsive to hydraulic pressure for effecting a brake application on a vehicle wheel and to relief of such pressure for effecting a brake release, conduit means comprising two pipes normally in communication with each other, one of said pipes being adapted for transmitting pressurized hydraulic fluid from a source, the other for transmitting said pressurized hydraulic fluid from said one pipe to said brake cylinder device, a source of pneumatic fluid under pressure, a piston valve device connected to said source of pneumatic fluid under pressure for controlling communication between said two pipes, said piston valve device comprising a piston responsive to pressure of pneumatic fluid from said source, in excess of a chosen degree, in a pneumatic chamber at one side of said piston to move to a normal position to open said communication and responsive to brake applying pressure of hydraulic fluid in a hydraulic chamber at the opposite side of said piston open to said brake cylinder device through said other pipe, upon relief of pneumatic fluid pressure in said pneumatic chamber, to move to a cut-off position to close said communication, said piston being operative to increase the volume of said hydraulic chamber to receive hydraulic fluid from said brake cylinder device upon movement of said piston to said cut-off position and to decrease in volume and displace said hydraulic fluid from said hydraulic chamber to said brake cylinder device upon movement of said piston to said normal position, control means responsive to a slipping condition of said wheel to effect relief of pneumatic pressure in said pneumatic chamber and responsive to termination of said slipping condition to open said pneumatic chamber to said source of pneumatic fluid pressure, and a by-pass valve device comprising a piston having at one side a pneumatic pressure chamber constantly open to said source of pneumatic fluid pressure and at the opposite side a hydraulic chamber, a first passageway connecting said by-pass hydraulic chamber to said other pipe, a second passageway open to said one pipe, said by-pass piston being responsive to pressure of pneumatic fluid, in excess of a certain degree above said chosen degree, in said pneumatic chamber of said by-pass device to move to a normal position in which communication between said passageways is closed and responsive to hydraulic pressure in said hydraulic chamber of said by-pass device, upon reduction of pneumatic pressure in said pneumatic chamber of said by-pass device to a degree below said certain degree, to move to a by-pass position in which communication between said passageway is open, said by-pass valve device further comprising a valve operable by said by-pass piston in its by-pass position to establish said communication between said first passageway and said second passageway through said hydraulic chamber of said by-pass device and operable by said by-pass piston in its normal position to close said communication between said first passageway and said second passageway.

6. A brake control apparatus comprising, in combination, a brake cylinder device responsive to hydraulic pressure for effecting a brake application on a vehicle wheel and to relief of such pressure for effecting a brake release, conduit means comprising two pipes, normally in communication with each other, one of said pipes being adapted for transmitting pressurized hydraulic fluid from a source, the other for transmitting said pressurized hydraulic fluid from said one pipe to said brake cylinder device, a source of pneumatic fluid under pressure, a piston valve device connected to said source of pneumatic fluid under pressure for controlling communication between said two pipes, said piston valve device being operable in response to pneumatic pressure from said source, in excess of a chosen degree, to open said communication and operable in response to hydraulic pressure in said conduit means, upon relief of such pneumatic pressure, to close said communication, control means responsive to a slipping condition of said wheel to effect relief of pneumatic pressure in said piston valve device and to termination of said slipping condition to open said piston valve device to said source of pneumatic fluid pressure, and means including electro-magnetic means controlled by and operative in response to reduction in pressure in said source to a certain degree below said chosen degree to lock said piston valve device in its said first position.

7. A brake control apparatus comprising, in combination, a brake cylinder device responsive to hydraulic pressure for effecting a brake application on a vehicle wheel and to relief of such pressure for effecting a brake release, conduit means comprising two pipes normally in communication with each other, one of said pipes being adapted for transmitting pressurized hydraulic fluid from a source, the other for transmitting said pressurized hydraulic fluid from said one pipe to said brake cylinder device, a source of pneumatic fluid under pressure, a piston valve device connected to said source of pneumatic fluid under pressure for controlling communication between said two pipes, said piston valve device being operable in response to pneumatic pressure from said source, in excess of a chosen degree, to a first position to open said communication and operable in response to hydraulic pressure in said conduit means, upon relief of such pneumatic pressure, to a second position to close said communication, control means responsive to a slipping condition of said wheel to effect relief of pneumatic pressure in said piston valve device and to termination of said slipping condition to open said piston valve device to said source of pneumatic fluid pressure, an electro-magnetic locking device comprising a plunger responsive to energization of said locking device for locking said piston valve device in its said first position and responsive to deenergization of said locking device for unlocking said piston valve device, a source of electrical energy for energizing said locking device, and an electric switch device controlled by pressure of fluid at said source operable to a closed circuit position in which said locking device is energized upon reduction in pressure of fluid at said source to a certain degree below said chosen degree and to an open circuit position in which said locking device is deenergized in response to pressure of fluid in said source in excess of said certain degree.

8. A brake control apparatus comprising, in combination, a brake cylinder device responsive to hydraulic pressure for effecting a brake application on a vehicle wheel and to relief of such pressure for effecting a brake release, conduit means comprising two pipes normally in communication with each other, one of said pipes being adapted for transmitting pressurized hydraulic fluid from a source, the other for transmitting said pressurized hydraulic fluid from said one pipe to said brake cylinder device, a source of pneumatic fluid under pressure, a piston valve device connected to said source of pneumatic fluid under pressure for controlling communication between said two pipes, said piston valve device being operable in response to pneumatic pressure from said source, in excess of a chosen degree, to a first position to open said communication and operable in response to hydraulic pressure in said conduit means, upon relief of such pneumatic pressure, to close said communication, control means responsive to a slipping condition of said wheel to effect relief of pneumatic pressure in said piston valve device and to termination of said slipping condition to open said piston valve device to said source of pneumatic fluid pressure, an electro-magnetic locking device comprising a plunger and operative upon energization to move said plunger into locking relation with said piston valve device to hold same in its said first position and a manually releasable latch cooperative with said plunger in its locking relation to maintain same in said locking relation, a source of electrical energy for energizing said electro-magnetic locking device, and an electric switch device controlled by pressure of fluid at said source and operative in response to a reduction thereof to a certain degree below said chosen degree to operate to one position in which said locking device is energized and in response to pressure of fluid at said source in excess of said certain degree to operate to another position in which said solenoid is deenergized.

9. A brake control apparatus comprising, in combination, a brake cylinder device responsive to hydraulic pressure for effecting a brake application on a vehicle wheel and to relief of such pressure for effecting a brake release, conduit means providing for flow of pressurized hydraulic fluid to and from said brake cylinder device, a source of pneumatic fluid under pressure, a piston valve device connected to said source of pneumatic fluid under pressure for controlling communication through said conduit means and comprising a piston having a valve associated therewith adapted for opening said communication in a first position and for closing said communication in a second position, said piston being responsive to pressure of fluid from said source, in excess of a chosen degree, for operating said valve to its first position and responsive to hydraulic pressure in said conduit means, upon relief of said pneumatic pressure for operating said valve to its second position, means responsive to a slipping condition of said wheel to effect operation of said piston and said valve to said second position and to termination of said slipping condition to effect operation of said piston and said valve to said first position, an electro-magnetic locking device comprising a plunger operative upon energization of said locking device into locking relation with said piston for maintaining said valve in its said first position and operative upon deenergization of said locking device out of said locking relation, a source of electrical energy for energizing said electro-magnetic locking device, and an electric switch device controlled by pressure of fluid at said source and operative in response to a reduction thereof to a certain degree below said chosen degree to operate to one position in which said locking device is energized and in response to pressure of fluid at said source, in excess of said certain degree, to operate to another position in which said locking device is deenergized.

10. A brake control apparatus comprising, in combination, a brake cylinder device, conduit means through which pressurized hydraulic fluid may be supplied to and released from said brake cylinder device to effect and release, respectively, a brake application on a vehicle wheel, valve means having one position in which communication through said conduit means is open and a second position in which communication through said conduit means is closed, a source of pneumatic fluid under pressure, a piston for operating said valve means, said piston having one side subject to pressure of fluid at said source and responsive to said pressure above a chosen degree to operate said valve means to its said one position and having the other side subject to pressure of hydraulic fluid in said conduit means, and responsive thereto upon relief of pneumatic fluid pressure from said one side of said piston, to operate said valve means to its said second position, means responsive to a slipping condition of said wheel for releasing pneumatic fluid pressure from said one side of said piston and responsive to termination of said slipping to open fluid pressure supply communication from said source to said one side of said piston, and means, also connected to and controlled by pressure of pneumatic fluid at said source, operative upon reduction of said pneumatic pressure at said source to a certain degree below said chosen degree, for maintaining a supply communication of pressurized hydraulic fluid to said brake cylinder device.

No references cited.